LE-ROY W. EARL.
CAN END LABELING MACHINE.
APPLICATION FILED SEPT. 7, 1909.

953,944.

Patented Apr. 5, 1910.
7 SHEETS—SHEET 1.

Fig. 1

Witnesses:
Robert N Weir
E. Behel

Inventor:
LeRoy W. Earl
By A.O. Behel
Atty

LE-ROY W. EARL.
CAN END LABELING MACHINE.
APPLICATION FILED SEPT. 7, 1909.

953,944.

Patented Apr. 5, 1910.
7 SHEETS—SHEET 3.

Witnesses:
Robert N. Meir
E. Behel

Inventor:
LeRoy W. Earl
By A. O. Behel
Atty.

LE-ROY W. EARL.
CAN END LABELING MACHINE.
APPLICATION FILED SEPT. 7, 1909.

953,944.

Patented Apr. 5, 1910.
7 SHEETS—SHEET 7.

Witnesses:
Robert N. Weir
E. Behel.

Inventor:
LeRoy W. Earl
By A. O. Behel
Atty.

UNITED STATES PATENT OFFICE.

LE-ROY W. EARL, OF PECATONICA, ILLINOIS.

CAN-END-LABELING MACHINE.

953,944.  Specification of Letters Patent.  Patented Apr. 5, 1910.

Application filed September 7, 1909. Serial No. 516,627.

*To all whom it may concern:*

Be it known that I, LE-ROY W. EARL, a citizen of the United States, residing at Pecatonica, in the county of Winnebago and State of Illinois, have invented certain new and useful Improvements in Can - End-Labeling Machines, of which the following is a specification.

The object of this invention is to apply paste to one end of a can, and afterward apply a label against the pasted end, these operations are automatically performed.

In the accompanying drawings.

The operative parts are mounted on a platform 1 which is supported upon standards 2 and 3. To the standard 2 is secured an angle plate 4, and to this angle plate are secured two plates 5 and 6 suitably separated. The plate 5 is formed with a foot 7, upon which is located a raised section 8 having inclined ends 9 and 10. These plates 5 and 6 form a pasage-way for the cans 11. The plate 6 is formed with four openings 12 and 13, opposite which the cans will pause in their movements.

Two sprocket wheels 14 and 15 are supported by the angle plate 4, and the plate 6 over which is placed a linked belt 16 supporting fingers 17. As the sprocket wheels revolve, the linked belt will be moved, and the fingers 17 will engage the cans 11 and carry them with the belt. The cans are fed onto the linked belt through the chute 18, and are delivered from the belt onto the incline 19.

The shaft 20 supporting the sprocket wheel 14 has a spur pinion 21 connected to it, and a spur gear 22 is supported by the plate 6 and meshes with the spur pinion 21. A ratchet wheel 23 has a fixed connection with the spur gear 22. A spring actuated dog 24 is adapted to engage the ratchet wheel 23, and is moved by the rod 25 having a connection with other movable parts of the machine.

Figures 7, 9:
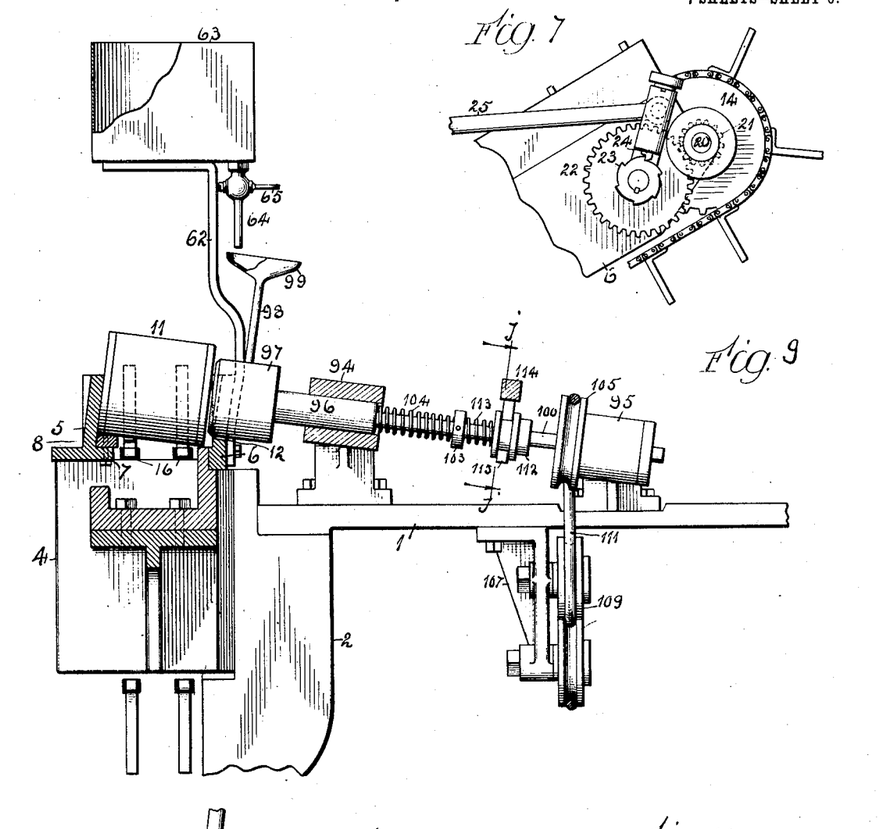
Fig. 7 is an elevation from the point shown by lines *e e* Fig. 1.
Fig. 9 is a section on dotted line *h* Fig. 1.
Figure 10:
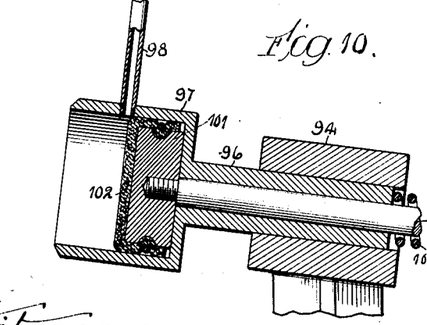
Fig. 10 is a section on dotted line *i* Fig. 1.
Figure 11:
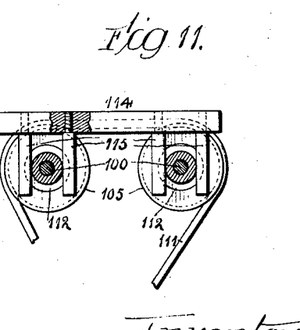
Fig. 11 is a section on dotted line *j j* Fig. 9.

A main drive shaft 26 is supported in a bearing 27 connected with the platform. Tight and loose pulleys 28 and 29 respectively are connected with the main drive shaft. A bevel pinion 30 is fixedly connected with the drive shaft 26. A secondary drive shaft 31 is supported in bearings 32 connected with the platform. A bevel gear 33 is fixedly connected with the shaft 31 and meshes with the bevel pinion 30. A shaft 34 is supported in bearings 35 connected with the platform and has a miter gear 36 connected to one end and a crank 37 connected to its other end. The miter gear 36 meshes with a miter gear 38 secured to the secondary drive shaft 31. The rod 25 has a connection with the crank 37, and as the main drive shaft revolves, the dog 24 will be oscillated and engage the ratchet wheel, thereby imparting an intermittent movement to the chain 16, and to the cans 11 carried by the chain. As the cans are moved by the chain 16, one end of each can will ride on the raised section 8, thereby tipping them as shown in Fig. 9. A plate 39 is located over the chain 16 which has a section 40 conforming to the inclined end 10 of the raised section 8 beneath which the cans 11 move and which insures the cans assuming a horizontal position. A spring 41 holds one end of the plate 39 yieldingly in order that the cans will be forced downward.

Figure 1:
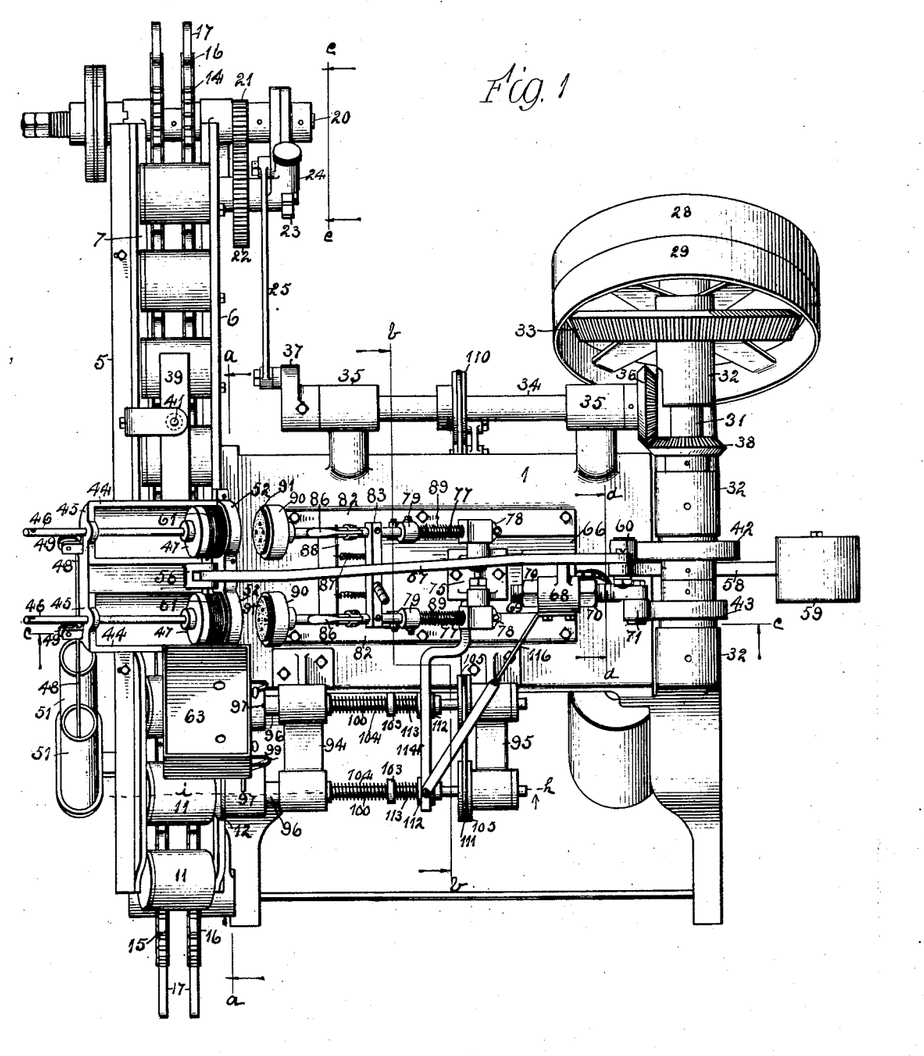
Figure 1 is a top view of my improved labeling machine.
Figure 2:
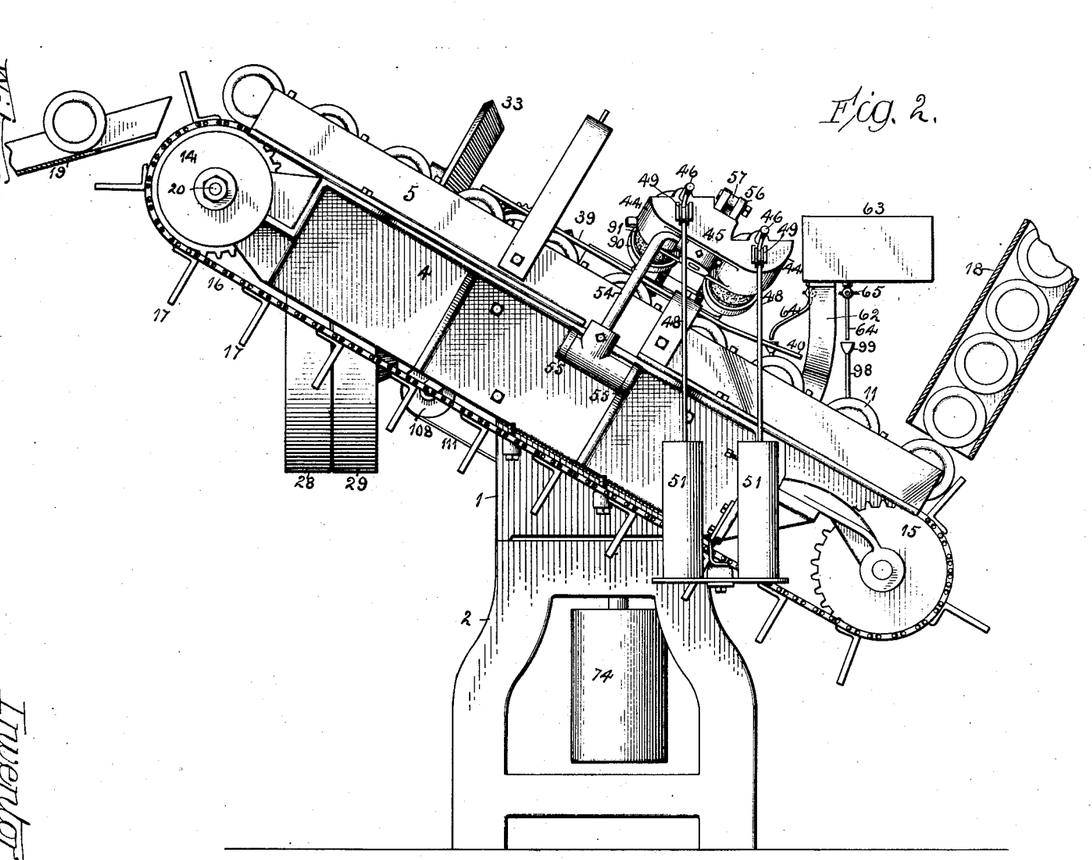
Fig. 2 is an end elevation.
Figures 3, 8:
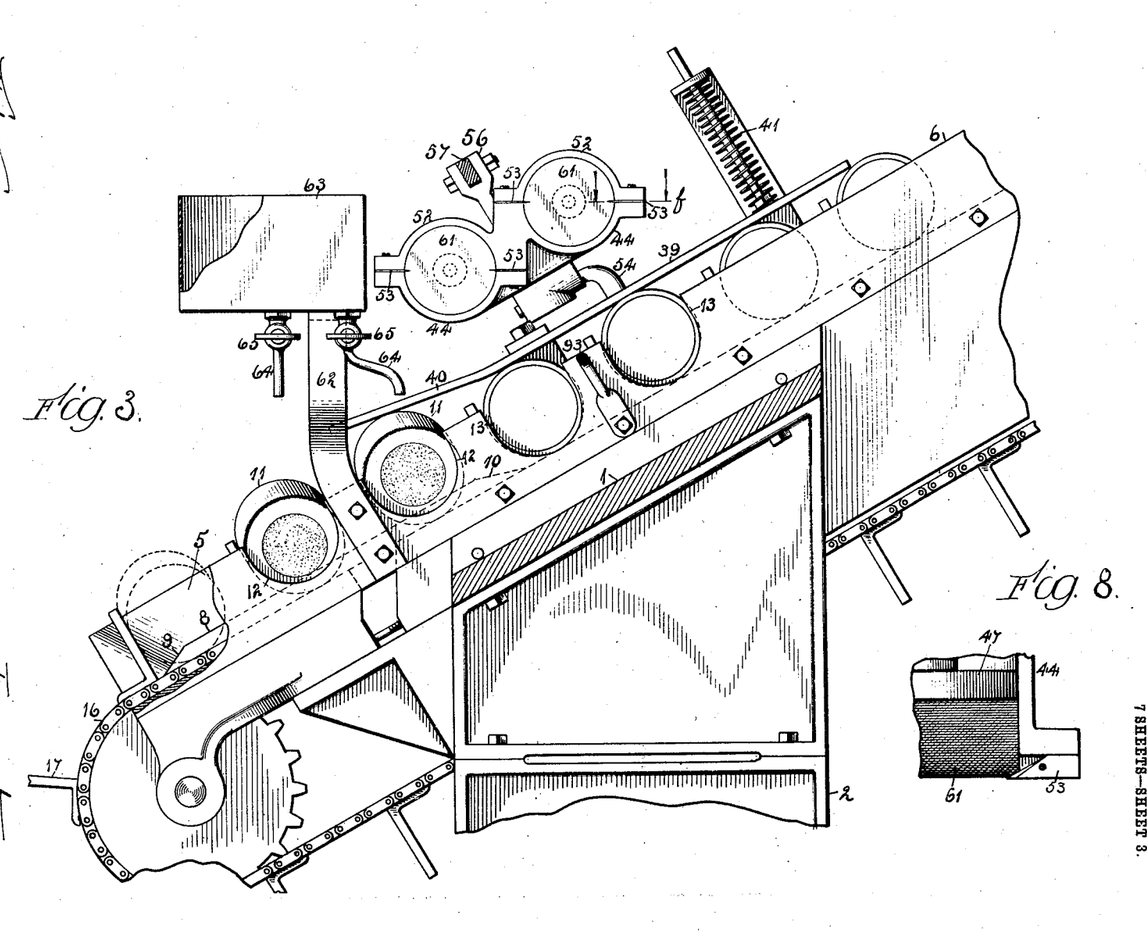
Fig. 3 is a vertical transverse section on dotted line *a a* Fig. 5.
Fig. 8 is a section on line *f* Fig. 3.
Figures 4, 6:
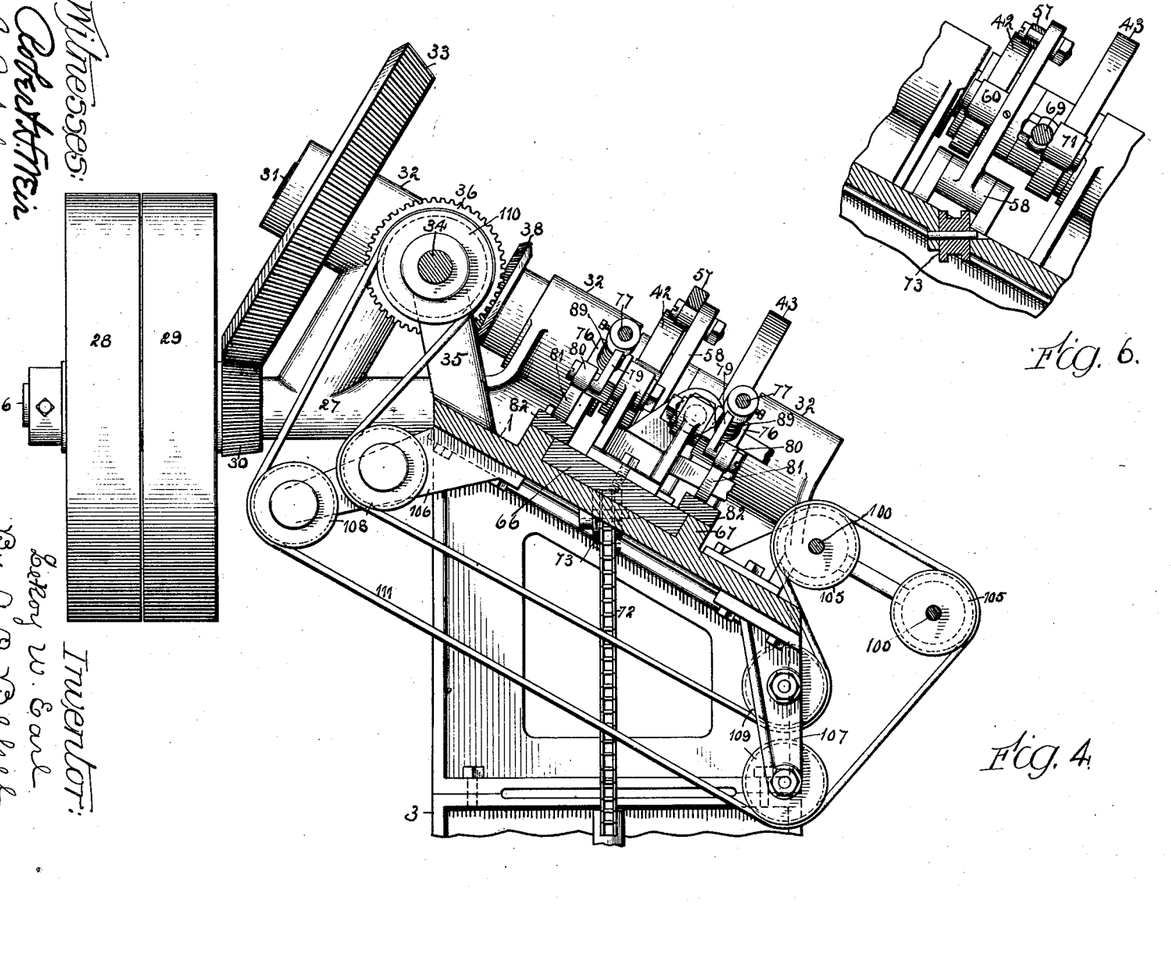
Fig. 4 is a vertical transverse section on dotted line *b b* Fig. 1.
Fig. 6 is a section on dotted line *d d* Figs. 1 and 5.
Figure 5:
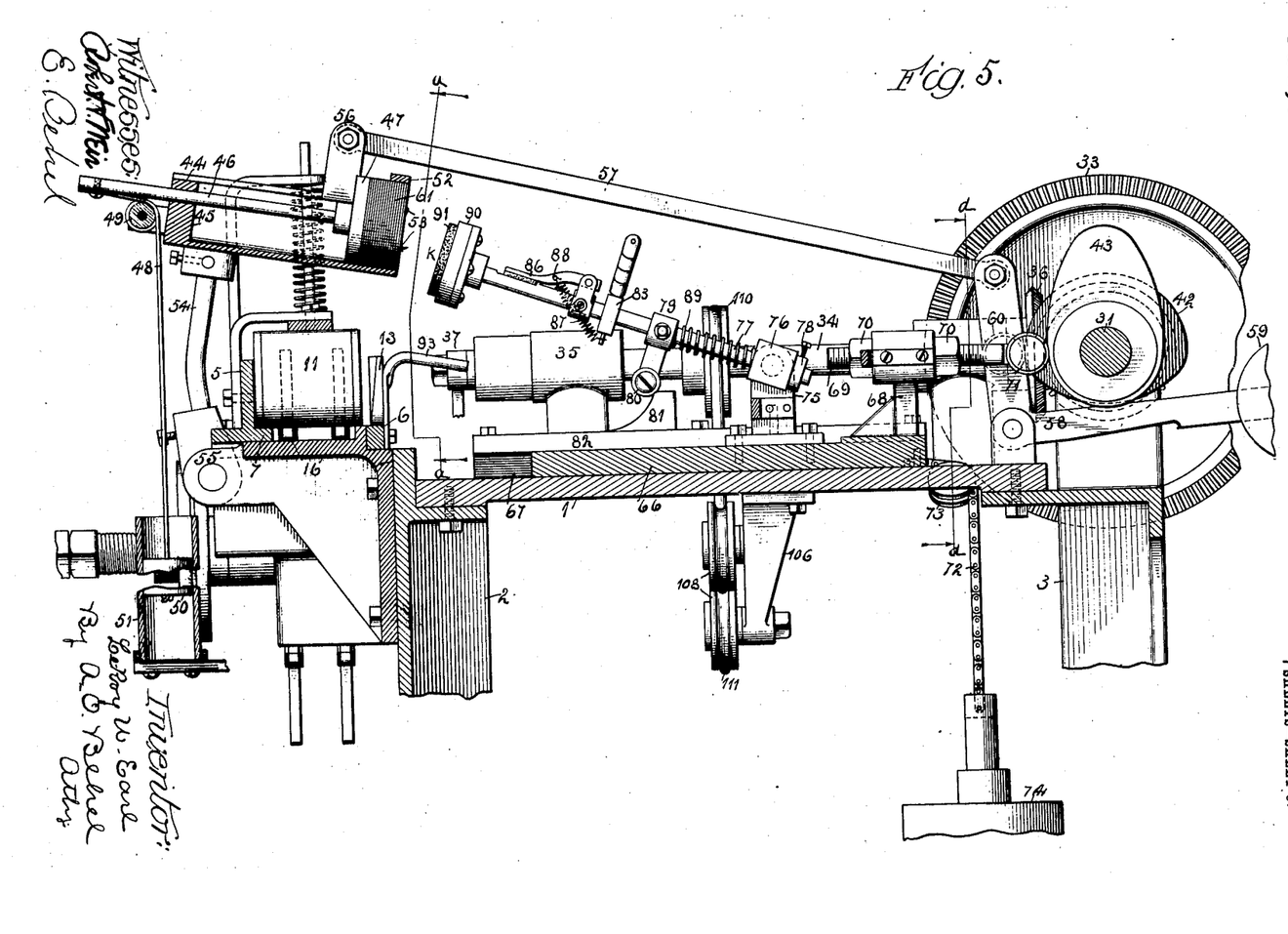
Fig. 5 is a vertical section on dotted line *c c* Fig. 1.

To the secondary shaft 31 are fixedly connected two cams 42 and 43. Duplex label holders of like construction are provided. Each holder comprises a semi-circular receptacle 44 having one end 45 closed through which is guided a piston rod 46, to one end of which is secured a piston 47. A cord 48 has a connection with the piston rod and passes over a roller 49 to the free end of which is secured a weight 50 movable in a cylinder 51 supported by the platform. The open end of the receptacle 44 is formed with a semi-ring 52, and between the semi-ring and the receptacle proper are located knives 53, as shown at Figs. 3 and 8. The duplex label holders are supported by the rod 54, the lower end of which is pivotally supported by ears 55 extending from the plate 4. An arm 56 is located between the label holders and fixedly connected thereto, and to its free end is pivotally connected a bar 57. A bell crank 58 is pivotally supported by the platform and to one arm thereof, the bar 57 is pivotally connected, and a weight 59 is adjustably connected along the other arm. A roller 60 is supported by the arm of the bell-crank to which the arm 57 is connected and rests against the cam 42. As the cam 42 rotates, the bell-crank will be oscillated and through the bar 57 an oscillatory movement will be imparted to the duplex label holders. The weight 59 will hold the roller 60 in contact with the cam at all times. The label holders are filled with labels 61 and the piston 47 is placed against them. The labels are held against the knives 53 as shown at Figs. 3, 5 and 8.

Figures 12, 13, 14, 15:
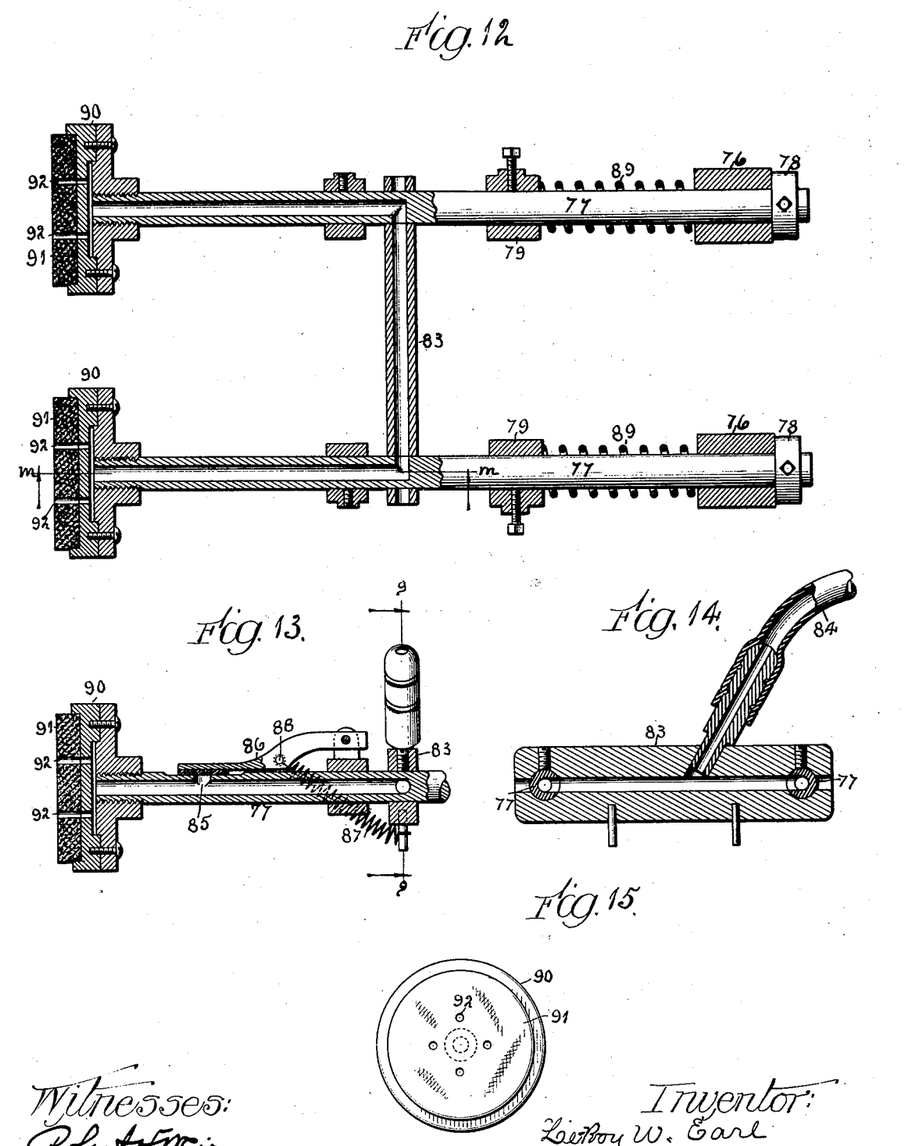
Fig. 12 is a section on dotted line *k* Fig. 5.
Fig. 13 is a section on dotted line *m m* Fig. 12.
Fig. 14 is a section on dotted line *g g* Fig. 13.
Fig. 15 is an end view of one of the label carrying heads.

A bracket 62 is secured to the plate 6, and a paste receptacle 63 is supported by this bracket. Two spouts 64 have a communication with the paste receptacle and each is provided with a cock 65. A slidable table 66 is supported in guide-ways 67 formed in the upper face of the main platform. An arm 68 extends from the upper face of the table and a screw-threaded rod 69 is supported by this arm and is adjustable lengthwise by the nuts 70 placed on either side of the arm. A roller 71 is supported by the rod 69 and rests against the cam 43. A chain 72 has one end connected with the table 66 and passes over a pulley 73 supported by the platform. A weight 74 is connected to the free end of the chain 72. This weight 74 will hold the roller 71 against the cam 43. The cam will move the table 66 in one direction and the weight 74 will move it in the reverse direction, thereby imparting a reciprocating movement to the table. A bracket 75 is supported by the table 66 and to it are pivotally connected two blocks 76, and each block is provided with an opening through which a tube 77 moves. A collar 78 is connected to each tube 77. An arm 79 is adjustably connected to a tube 77 and supports a roller 80 at its free end, which is adapted to move against the inclined surface 81 and along the plate 82 connected to the platform. The two tubes 77 are connected by a tubular cross-bar 83. A hose 84 has a communication with the cross-bar 83 as shown at Fig. 14. Each tube 77 has an opening 85 in its upper face as shown at Fig. 13, and a valve 86 is pivotally supported by the tube and adapted to close the opening. A spring 87 has a connection with the valve and will hold it closed. The valves 86 of the two tubes 77 are connected by a rod 88. A spring 89 is located between the arm 79 and the block 76, its action being to hold the collar 78 yieldingly against the block 76. Each tube 77 supports a head 90 having a yielding face 91. Openings 92 extend through the face and communicate with tube 77.

As the table 66 reciprocates, the heads 90 are carried with it, and as the inclined surfaces 80 are stationary, the rollers 80 will descend, thereby lowering the heads so that they will be in line with the ends of the cans opposite the openings 13 in the plate 6. The return movement of the table will elevate the heads into the position shown at Fig. 5 of the drawings. Before the heads reach the end of their movement when lowered, the rod 88 connecting the valves 86 will contact with the downwardly extending arm 93, fixedly connected to the plate 6, thereby raising the valves free of the openings 85 in the tubes 77.

From the platform extend two brackets 94 and 95. The bracket 94 supports two tubular sleeves 96 each provided with a cylinder cup 97. Pipes 98 connect with the cups and each has a funnel 99 at its upper end, which are located beneath the pipes 64 communicating with the paste receptacle 63. A rod 100 is located axially within each of the tubular sleeves 96, and is also supported by the bracket 95. A plunger 101 having a yielding face and edges 102 is located in each cup 97 and is connected to the rod 100. A collar 103 is connected to the rod 100 and a spring 104 has one end resting against the collar 103 and its other end against the tubular sleeve 96. A pulley 105 has a driving connection with each rod 100 and the rod is capable of a lengthwise movement through the pulley. Two brackets 106 and 107 are connected with the platform and each support two pulleys 108 and 109 respectively. A pulley 110 is fixedly connected to the shaft 34. A bolt 111 connects the pulleys 105, 109, 108 and 110, and as the pulley 110 is rotated, the pulleys 105 will be rotated, which will rotate the rods 100 and the plungers 101 connected therewith. A grooved faced collar 112 is supported by each rod 100 and a spring 113 is located between the collars 103 and 112. To the reciprocating table 66 is secured a bar 114 which extends over the collars 112 and from its underface depend two projections 115 located within the groove of each collar 112. A brace bar 116 has one end connected to the free end of the bar 114 and its other end is connected to the bracket 68, and serves to hold the bar rigid.

As the table 66 reciprocates, the bar 114 will be carried with it, which will move the collars 112 and through the springs 113 and 104 resting against the collars 103 move the rods 100 and cups 97 toward the cans exposed through the openings 12 in the plate 6 until the cups contact with the cans. The further movement of the rods 100 will compress the springs 113 and 104, and as the cups are at rest, will move the yielding faces 102 of the plungers against the cans. The withdrawal of the table will return the parts to their normal positions.

In operating the machine, paste is placed in the receptacle 63, and permitted to drip into the funnels 99, and drop into the cups between the plungers 101 and the open ends of the cups 97. The carrier 16 is given an intermittent movement which will present two cans through the openings 12 in the plate 6. The cups 97 and plungers 101 are moved as before described which will hold the cups against the ends of the cans. The plungers which are constantly rotating will contact with the ends of the cans, and apply paste to the cans. The plungers and cups are then withdrawn. The carrier will move sufficiently to present the two pasted cans through the openings 13 in the plate 6. The label holders are tipped until the labels carried thereby contact with the heads. Air suction is created through the hose 84, which will exert sufficient force to remove two labels from the two label holders and hold them against the heads 90. The label holders are then returned to their former positions. The table 66 is then moved outward which will carry the heads 90 with it and also lower them into positions opposite the pasted cans. The further movement of the table will move the heads against the pasted ends of the cans. At this point, the valves 86 will be opened which will break the air suction and allow the labels to adhere to the cans. The heads are then returned to their starting positions ready to receive other labels. The carrier is again moved to put two cans to be pasted, two cans to have their labels applied, and the labeled cans carried toward the delivery end of the carrier. These operations are entirely automatic, and the capacity of the machine is doubled by the employment of the two paste supplying plungers and two label applying devices. By tipping the cans while the paste is being applied, the cups 97 will stand so that their open ends are higher than their closed ends which will permit the paste to run down against the plungers instead of wasting out the open ends of the cans.

I claim as my invention—

1. In a can end labeling machine, the combination of a can carrier, means for imparting an intermittent movement to the carrier, a paste holder, a cup receiving paste from the holder, a plunger located within the cup and capable of a reciprocating movement and a rotary movement, and a label applying device.

2. In a can end labeling machine, the combination of a can carrier, means for imparting an intermittent movement to the carrier, a label holder capable of a rocking movement, means for rocking the holder, a head capable of a rocking movement, means for creating vacuum within the head, and a valve for relieving the vacuum.

3. In a can end labeling machine, the combination of a can carrier, means for imparting an intermittent movement to the carrier, a label holder capable of a rocking movement, means for rocking the holder, a piston movably supported by the holder, means for moving the piston, label retainers supported by the holder, a head capable of a rocking movement, means for creating vacuum within the head, and a valve for relieving the vacuum.

4. In a can end labeling machine, the combination of a can carrier, means for imparting an intermittent movement to the carrier, means for tipping the cans during their movement, a device for applying paste to the cans while in their tipped position, and a label applying device.

5. In a can end labeling machine, the combination of a can carrier, means for imparting an intermittent movement to the carrier, means for tipping the cans during their movement, a cup in alinement with the tipped cans, a plunger located within the cup, means for imparting a reciprocating and rotary movement to the plunger, and a label applying device.

6. In a can end labeling machine, the combination of a can carrier, means for imparting an intermittent movement to the carrier, means for tipping the cans during their movement, a cup in alinement with the tipped cans, means for applying paste to the cup, a plunger located within the cup, means for imparting a reciprocating movement to the cup and plunger, means for rotating the plunger, and a label applying device.

7. In a can end labeling machine, the combination of a can carrier, means for imparting an intermittent movement to the carrier, a cup, means for supplying paste to the cup, a plunger located within the cup and having a yielding face, means for imparting a reciprocating movement to the plunger, and a label applying device.

8. In a can end labeling machine, the combination of a can carrier, means for imparting an intermittent movement to the carrier, a main frame, a table supported by the frame, a cam for imparting a reciprocating movement to the table in one direction, a weight for moving the table in the opposite direction, a paste applying device and a label applying device supported by the table and movable therewith.

9. In a can end labeling machine, the combination of a can carrier, means for imparting an intermittent movement to the carrier, a label holder, a device for transferring labels from the holder to the cans, said device capable of oscillatory and reciprocating movements, and means for imparting said movements.

In testimony whereof I have hereunto set my hand in presence of two subscribing witnesses.

LE-ROY W. EARL.

Witnesses:
BERTRAM M. WEAVER,
HERBERT HOBSON.